United States Patent
Bridgman et al.

(10) Patent No.: US 6,523,062 B1
(45) Date of Patent: Feb. 18, 2003

(54) FACILITATING MEMORY CONSTRAINED CLIENT DEVICES BY EMPLOYING DECK REDUCTION TECHNIQUES

(75) Inventors: Thomas E. Bridgman, Croton-on-Hudson, NY (US); David B. Lection; Ajamu A. Wesley, both of Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/342,884

(22) Filed: Jun. 29, 1999

(51) Int. Cl.[7] ............................................. G06F 15/16
(52) U.S. Cl. .................. 709/203; 709/203; 709/230; 370/392; 455/403; 455/405
(58) Field of Search ................. 709/230, 232, 709/238, 201, 203

(56) References Cited

U.S. PATENT DOCUMENTS 6,108,530 A * 8/2000 Ayabe et al. ................ 455/403
6,185,208 B1 * 2/2001 Liao ............................ 370/392
6,301,471 B1 * 10/2001 Dahm et al. ................ 455/405

* cited by examiner

Primary Examiner—Ayaz Sheikh
Assistant Examiner—Thu Ha Nguyen
(74) Attorney, Agent, or Firm—Jeanine S. Ray-Yarletts; Marcia L. Doubet

(57) ABSTRACT

A method, system, and computer program product for facilitating network delivery of Wireless Markup Language (WML) decks (or decks in similar notations) to memory-constrained client devices such as Wireless Application Protocol (WAP) devices, by applying a novel deck-reduction process to the decks, such that the decks are reduced by fragmentation into new decks of a manageable size. No loss of deck content occurs in this fragmentation process. The cards of the original deck are grouped into new sub-decks, where each sub-deck is no larger than a particular maximum deck size. When defining the new sub-decks, card adjacency is used along with commonality of event bindings and text strings, in order to regroup the cards in such a way as to reduce the size of the resulting sub-decks while minimizing the number of remote references generated.

27 Claims, 18 Drawing Sheets

FIG. 4A
400

```
<wml>
  <template>
    <do type="prev" label="Prev">      ── 410
      <prev/>
    </do>
  </template>

<card id="p1" title="News - pg 1">
    <do type="accept" label="Next">
      <go href="#p2"/>
    </do>
    <do type="prev" label="Prev">  ┐
      <go href="home.wml"/>         ├─ 421
    </do>                          ┘     ── 420

<p>
    On June 14, IBM Chairman and CEO Lou Gerstner spoke before the
    Joint Economic Committee's first National Summit on High Technology.
    </p>
  </card>

<card id="p2" title="News - pg 2">
    <do type="accept" label="Next">
      <go href="#p3"/>
    </do>

<p>
    The Joint Economic Committee consists of members of the Senate and of    ── 430
    the House of Representatives, drawn from both political parties.  The
    National Summit on High Technology includes three days of hearings,
    featuring testimony from high-tech industry leaders -- designed to
    focus on issues that are important to this vital and growing economic
    segment.
    </p>
  </card>
```

FIG. 4B

```
<card id="p3" title="News - pg 3">
   <do type="accept" label="Next">          441
     <go href="#p4"/>
   </do>       \
               442

<p>
  Here are Mr. Gerstner's remarks.
  <br/>
  Mr. Chairman, I would like to thank you, Senate Majority Leader Lott
  and Senator Bennett for providing this forum and for the opportunity
  to participate in this important discussion. I am here -- we're all
  here -- to talk about a revolution. It emanates from the relentless
  advance of information technology. And it draws sustenance from a
  new development -- the long-awaited merger of computing and
  communications to create what is often called a networked economy, or
  networked society.
  </p>
</card>     451
           /
<card id="p4" title="News - pg 4">
  <do type="accept" label="Next">
    <go href="home.wml"/>           452
  </do>

<p>
  But my message today is that the real revolution is not about
  technology. It is not about a new model of computing based on the
  Internet. We are witnessing nothing less than the rise of a new
  economy -- a digital economy -- and a new global medium that will be
  the single most important driver of business, economic and social
  change in the coming century. It will alter the way we teach our
  sons and daughters, care for our aged, reach out to the disabled and
  homebound, and enlighten the isolated and disenfranchised. It can
  create new opportunities to help close the divide that exists today
  between the rich and the poor. And it will exert new pressures on
  existing geopolitical structures and all their underlying economic
  assumptions.
  </p>
</card>
</wml>
```

440 — (top card block)
450 — (bottom card block)

```
<wml> 512
    ┌<template>
    │   <do type="prev" label="Prev">
501─┤     <prev/>
    │   </do>
    └</template>

<card id="p1" title="News - pg 1">
       <do type="accept" label="Next">
         <go href="#p2"/>
       </do>
       <do type="prev" label="Prev">
         <go href="home.wml"/>
       </do>

<p>
       On June 14, IBM Chairman and CEO Lou Gerstner spoke before the
       Joint Economic Committee's first National Summit on High Technology.
       </p>
    </card>

<card id="p2" title="News - pg 2">
       <do type="accept" label="Next">
         <go href="#p3"/>
       </do>

<p>
       The Joint Economic Committee consists of members of the Senate and of
       the House of Representatives, drawn from both political parties.  The
       National Summit on High Technology includes three days of hearings,
       featuring testimony from high-tech industry leaders -- designed to
       focus on issues that are important to this vital and growing economic
       segment.
       </p>
    </card>
```

FIG. 5A2

```
<card id="p3" title="News - pg 3">
  <do type="accept" label="Next">         ⎤
    <go href="#frag1"/>                    ⎬ 506
  </do>                                    ⎦

<p>
  Here are Mr. Gerstner's remarks.
  <br/>
  Mr. Chairman, I would like to thank you, Senate Majority Leader Lott
  and Senator Bennett for providing this forum and for the opportunity
  to participate in this important discussion. I am here -- we're all
  here -- to talk about a revolution. It emanates from the relentless
  </p>
</card>
```
502

507

```
<card id="frag1" title="News - pg 3">
  <do type="accept" label="Next">         ⎤
    <go href="#p4"/>                       ⎬ 508
  </do>                                    ⎦

<p>
  advance of information technology. And it draws sustenance from a
  new development -- the long-awaited merger of computing and
  communications to create what is often called a networked economy, or
  networked society.
  </p>
</card>
```
503

FIG. 5A3

```
<card id="p4" title="News - pg 4">
  <do type="accept" label="Next">
    <go href="#frag2"/>
  </do>                              ─510

<p>
  But my message today is that the real revolution is not about
  technology. It is not about a new model of computing based on the
  Internet. We are witnessing nothing less than the rise of a new
  economy -- a digital economy -- and a new global medium that will be
  the single most important driver of business, economic and social
  change in the coming century. It will alter the way we teach our
  </p>
</card>
                509
<card id="frag2" title="News - pg 4">
  <do type="accept" label="Next">
    <go href="home.wml"/>
  </do>                              ─511

<p>
  sons and daughters, care for our aged, reach out to the disabled and
  homebound, and enlighten the isolated and disenfranchised. It can
  create new opportunities to help close the divide that exists today
  between the rich and the poor. And it will exert new pressures on
  existing geopolitical structures and all their underlying economic
  assumptions.
  </p>
</card>  513
</wml>
```

504 — (upper card block)
505 — (lower card block)

```
<wml>
  <card id="p1" title="News - pg 1">
    <do type="accept" label="Next">
      <go href="#p2"/>
    </do>
    <do type="prev" label="Prev">        ⎤
      <go href="home.wml"/>              ⎬ 526
    </do>                                ⎦

<p>
    On June 14, IBM Chairman and CEO Lou Gerstner spoke before the
    Joint Economic Committee's first National Summit on High Technology.
    </p>
  </card>
```
520

```
  <card id="p2" title="News - pg 2">
    <do type="accept" label="Next">
      <go href="#p3"/>
    </do>
    <do type="prev" label="Prev">        ⎤
      <prev/>                            ⎬ 527
    </do>                                ⎦

<p>
    The Joint Economic Committee consists of members of the Senate and of
    the House of Representatives, drawn from both political parties. The
    National Summit on High Technology includes three days of hearings,
    featuring testimony from high-tech industry leaders -- designed to
    focus on issues that are important to this vital and growing economic
    segment.
    </p>
  </card>
```
521

FIG. 5B2

```
522 ─┤
      ┌─ <card id="p3" title="News - pg 3">
      │    <do type="accept" label="Next">
      │      <go href="#frag1"/>
      │    </do>
      │    <do type="prev" label="Prev"> ┐
      │      <prev/>                     ├─ 528
      │    </do>                         ┘
      │
      │    <p>
      │    Here are Mr. Gerstner's remarks.
      │    <br/>
      │    Mr. Chairman, I would like to thank you, Senate Majority Leader Lott
      │    and Senator Bennett for providing this forum and for the opportunity
      │    to participate in this important discussion. I am here -- we're all
      │    here -- to talk about a revolution. It emanates from the relentless
      │    </p>
      └─ </card>

523 ─┤
      ┌─ <card id="frag1" title="News - pg 3">
      │    <do type="accept" label="Next">
      │      <go href="#p4"/>
      │    </do>
      │    <do type="prev" label="Prev"> ┐
      │      <prev/>                     ├─ 529
      │    </do>                         ┘
      │
      │    <p>
      │    advance of information technology. And it draws sustenance from a
      │    new development -- the long-awaited merger of computing and
      │    communications to create what is often called a networked economy, or
      │    networked society.
      │    </p>
      └─ </card>
```

FIG. 5B3

```
 ⌈<card id="p4" title="News - pg 4">
 |  <do type="accept" label="Next">
 |    <go href="#frag2"/>
 |  </do>
 |  <do type="prev" label="Prev"> ⌉
 |    <prev/>                      ├─ 530
 |  </do>                          ⌋
524 ─┤
 |  <p>
 |  But my message today is that the real revolution is not about
 |  technology. It is not about a new model of computing based on the
 |  Internet. We are witnessing nothing less than the rise of a new
 |  economy -- a digital economy -- and a new global medium that will be
 |  the single most important driver of business, economic and social
 |  change in the coming century. It will alter the way we teach our
 |  </p>
 ⌊</card>

⌈<card id="frag2" title="News - pg 4">
 |  <do type="accept" label="Next">
 |    <go href="home.wml"/>
 |  </do>
 |  <do type="prev" label="Prev"> ⌉
 |    <prev/>                      ├─ 531
 |  </do>                          ⌋
525 ─┤
 |  <p>
 |  sons and daughters, care for our aged, reach out to the disabled and
 |  homebound, and enlighten the isolated and disenfranchised. It can
 |  create new opportunities to help close the divide that exists today
 |  between the rich and the poor. And it will exert new pressures on
 |  existing geopolitical structures and all their underlying economic
 |  assumptions.
 |  </p>
 ⌊</card>
   </wml>
```

FIG. 5C p1 — p2 — p3 — frag1 — p4 — frag2

FIG. 5D1

| p1, p2 | (0,0) |
| p2, p3 | (1,0) |
| p3, frag1 | (1,0) |
| frag1, p4 | (1,0) |
| p4, frag2 | (1,0) |

FIG. 5D2

|  | p1 | p2 | p3 | frag1 | p4 | frag2 |
|---|---|---|---|---|---|---|
| p1 | - | 0,0 | 0,0 | 0,0 | 0,0 | 0,0 |
| p2 |  | - | 1,0 | 1,0 | 1,0 | 1,0 |
| p3 |  |  | - | 1,0 | 1,0 | 1,0 |
| frag1 |  |  |  | - | 1,0 | 1,0 |
| p4 |  |  |  |  | - | 1,0 |
| frag2 |  |  |  |  |  | - |

```
<wml>
  <card id="p1" title="News - pg 1">
    <do type="accept" label="Next">
      <go href="#p2"/>
    </do>
    <do type="prev" label="Prev">
      <go href="home.wml"/>
    </do>

<p>
    On June 14, IBM Chairman and CEO Lou Gerstner spoke before the
    Joint Economic Committee's first National Summit on High Technology.
    </p>
  </card>

<card id="p2" title="News - pg 2">
    <do type="accept" label="Next">
      <go href="#p3"/>
    </do>
    <do type="prev" label="Prev">
      <prev/>
    </do>

<p>
    The Joint Economic Committee consists of members of the Senate and of
    the House of Representatives, drawn from both political parties.  The
    National Summit on High Technology includes three days of hearings,
    featuring testimony from high-tech industry leaders -- designed to
    focus on issues that are important to this vital and growing economic
    segment.
    </p>
  </card>
</wml>
```

541 — first card block
547 — `<go href="#p3"/> </do>`
542 — second card `<p>` block

```
<wml>
  <template>
    <do type="prev" label="Prev">      551
      <prev/>
    </do>
  </template>
                                        554
  <card id="p3" title="News - pg 3">
    <do type="accept" label="Next">
      <go href="#frag1"/>
    </do>

<p>
    Here are Mr. Gerstner's remarks.    552
    <br/>
    Mr. Chairman, I would like to thank you, Senate Majority Leader Lott
    and Senator Bennett for providing this forum and for the opportunity
    to participate in this important discussion.  I am here -- we're all
    here -- to talk about a revolution.  It emanates from the relentless
    </p>
  </card>

<card id="frag1" title="News - pg 3">
    <do type="accept" label="Next">
      <go href="#p4"/>
    </do>

<p>                                  553
    advance of information technology.  And it draws sustenance from a
    new development -- the long-awaited merger of computing and
    communications to create what is often called a networked economy, or
    networked society.
    </p>
  </card>
</wml>
```

```
<wml>
  <template>
    <do type="prev" label="Prev">       ← 561
      <prev/>
    </do>
  </template>

564
  <card id="p4" title="News - pg 4">
    <do type="accept" label="Next">
      <go href="#frag2"/>
    </do>

<p>
    But my message today is that the real revolution is not about
    technology. It is not about a new model of computing based on the
    Internet. We are witnessing nothing less than the rise of a new
    economy -- a digital economy -- and a new global medium that will be
    the single most important driver of business, economic and social
    change in the coming century. It will alter the way we teach our
    </p>
  </card>                                                           ← 562

<card id="frag2" title="News - pg 4">
    <do type="accept" label="Next">
      <go href="home.wml"/>
    </do>

<p>
    sons and daughters, care for our aged, reach out to the disabled and
    homebound, and enlighten the isolated and disenfranchised. It can
    create new opportunities to help close the divide that exists today
    between the rich and the poor. And it will exert new pressures on
    existing geopolitical structures and all their underlying economic
    assumptions.
    </p>
  </card>                                                           ← 563
</wml>
```

```
<wml>
  <card id="p1" title="News - pg 1">
    <do type="accept" label="Next">
      <go href="#p2"/>
    </do>
    <do type="prev" label="Prev">
      <go href="home.wml"/>
    </do>

<p>
    On June 14, IBM Chairman and CEO Lou Gerstner spoke before the
    Joint Economic Committee's first National Summit on High Technology.
    </p>
  </card>

<card id="p2" title="News - pg 2">
    <do type="accept" label="Next">          546
      <go href="360b.wml#p3"/>
    </do>       545
    <do type="prev" label="Prev">
      <prev/>
    </do>

<p>
    The Joint Economic Committee consists of members of the Senate and of
    the House of Representatives, drawn from both political parties.  The
    National Summit on High Technology includes three days of hearings,
    featuring testimony from high-tech industry leaders -- designed to
    focus on issues that are important to this vital and growing economic
    segment.
    </p>
  </card>
</wml>
```

```
<wml>
  <template>
    <do type="prev" label="Prev">
      <prev/>
    </do>
  </template>
                    554
  <card id="p3" title="News - pg 3">
    <do type="accept" label="Next">
      <go href="#frag1"/>
    </do>

<p>
    Here are Mr. Gerstner's remarks.
    <br/>
    Mr. Chairman, I would like to thank you, Senate Majority Leader Lott
    and Senator Bennett for providing this forum and for the opportunity
    to participate in this important discussion.  I am here -- we're all
    here -- to talk about a revolution.  It emanates from the relentless
    </p>
  </card>

<card id="frag1" title="News - pg 3">
    <do type="accept" label="Next">
      <go href="360c.wml#p4"/>
    </do>
              555      556
    <p>
    advance of information technology.  And it draws sustenance from a
    new development -- the long-awaited merger of computing and
    communications to create what is often called a networked economy, or
    networked society.
    </p>
  </card>
</wml>
```

```
<wml>
  <template>
    <do type="prev" label="Prev">
      <prev/>
    </do>
  </template>
                          564
                         /
  <card id="p4" title="News - pg 4">
    <do type="accept" label="Next">
      <go href="#frag2"/>
    </do>

<p>
    But my message today is that the real revolution is not about
    technology. It is not about a new model of computing based on the
    Internet. We are witnessing nothing less than the rise of a new
    economy -- a digital economy -- and a new global medium that will be
    the single most important driver of business, economic and social
    change in the coming century. It will alter the way we teach our
    </p>
  </card>

<card id="frag2" title="News - pg 4">
    <do type="accept" label="Next">
      <go href="home.wml"/>
    </do>

<p>
    sons and daughters, care for our aged, reach out to the disabled and
    homebound, and enlighten the isolated and disenfranchised. It can
    create new opportunities to help close the divide that exists today
    between the rich and the poor. And it will exert new pressures on
    existing geopolitical structures and all their underlying economic
    assumptions.
    </p>
  </card>
</wml>
```

FACILITATING MEMORY CONSTRAINED CLIENT DEVICES BY EMPLOYING DECK REDUCTION TECHNIQUES

BACKGROUND OF THE INVENTION

1. Field of the Invention

The present invention relates to a computer system, and deals more particularly with a method, system, and computer-readable code for facilitating network delivery of Wireless Markup Language (WML) decks (or decks in similar notations) to memory-constrained client devices such as Wireless Application Protocol (WAP) devices, by applying a novel deck-reduction process to the decks, such that the decks are reduced by fragmentation into new decks of a manageable size.

2. Description of the Related Art

The Wireless Application Protocol, or "WAP", is an industry standard protocol specification created for mobile Internet use. WAP was defined by the WAP Forum, and specifies protocols for delivering information over a wireless network to WAP client devices (where a "WAP client device", or "WAP client", is a device conforming to the WAP architectural requirements).

The WAP Forum has also defined the Wireless Markup Language, or "WML", which is a markup language for documents that are intended for delivery to WAP clients. A markup language uses specially-designated constructs referred to as "tags"to delimit (or "mark up") information. WML is based on the Extensible Markup Language ("XML"), which is a standard grammar for markup languages. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. In XML and its derivative notations, a tag is inserted preceding its associated data: a corresponding tag is also inserted following the data, to clearly identify where that data ends. As an example of using tags, the syntax "<email>" could be used as a tag to indicate that the character string appearing in the data stream after this tag is to be treated as an e-mail address; the syntax "</email>" would then be inserted after the character string, to delimit where the e-mail character string ends. (Refer to "Wireless Application Protocol Wireless Markup Language Specification Version 1.1 (WAP WML), Proposed Version Feb. 3, 1999" for more information on WML, and to "Extensible Markup Language (XML), W3C Recommendation Feb. 10, 1998" for more information on XML. These documents are available on the World Wide Web from Web sites http://www.wapforum.org and http://www.w3.org, respectively.)

WML is specifically designed for the limitations that are often inherent in the client devices used in the mobile, or wireless, computing environment. Client devices common in this environment include cellular phones, screenphones, pagers, and laptop computers. While laptop computers may be nearly equivalent in features and capabilities to non-mobile computing devices such as desktop computers, many of the other devices used in the wireless environment tend to be small, handheld devices that have limited memory and storage, as well as limited display space. Section 4.5, "Device Types", of the WML specification provides a description of the characteristics of devices for which WML was designed. These characteristics include small display screen size, with low resolution; limited user input facilities; low power CPUs and small memory size; and capable of supporting only low bandwidth connections, therefore resulting in high latency. An example of this type of device is the Nokia 7110, a WAP-enabled cellular phone with a maximum display area of 6 lines of text. Another example device is the WorkPad available from the International Business Machines Corporation ("IBM"). This device is a handheld computer typically configured with several megabytes of storage, where that storage is as Random Access Memory ("RAM") to avoid the system overhead associated with other types of storage such as disk drives. ("WorkPad" is a registered trademark of IBM.)

WML is defined using a metaphor of a deck of cards, where a WML deck is comprised of one or more cards. A WML deck is analogous to a document in XML, and is the unit of information identified by a URL (Uniform Resource Locator). Thus, a WML deck is also the unit of transmission, as it comprises the information delivered to the client machine in response to a request (e.g. from a client browser) for a particular URL. Each card within the deck specifies text and input elements, and is defined in Section 4.1, "Definitions", of the WML specification as "a single WML unit of navigation and user interface". Thus, when a document author creates a WML deck, he divides the information into cards using "<card>" and "</card>" tags to mark the beginning and end of each card.

Authors creating documents as WML decks typically create the decks to be small in size, to accommodate the memory and processing limitations inherent in the target client devices. However, problems often arise when a user of a WAP-enabled device requests a document that was not created specifically with the wireless device limitations in mind. For example, it is becoming commonplace for XML documents (created irrespective of the client device) to be transcoded or otherwise transformed for downloading. When the target device is a relatively powerful machine with a large storage capacity such as a desktop computer, then downloading the XML document is unlikely to create problems. However, when the target device is a constrained device, then there may not be sufficient space for receiving and storing the document on the device. In addition, the processing capabilities of a constrained device may be insufficient for a document created without regard to the limitations of these devices.

Extensible Stylesheet Language ("XSL") style sheets provide an efficient means of filtering documents (such as XML documents), by defining translations on an input document that create only a specific set of desired document elements in the resulting output document. As is known in the art, a "style sheet" is a specification of a style that is to be used when presenting a document. Style sheets may also be utilized to describe transformations from one document type to another, such as transforming an XML document to a WML document. Style sheets may also be used as filters which describe transformations to reduce the amount of document content while maintaining the original document type. However, XSL style sheet filtering does not provide a means for limiting the size of the output document. WML decks in excess of 1 kilobyte in size may overload a constrained storage device, leading to undefined behavior when the device attempts to process the deck. From a user's perspective, it is unacceptable to allow this undefined behavior to occur.

The Wireless Application Protocol Binary XML notation, or "WBXML", also uses a card and deck metaphor.

WBXML is a compact binary form of XML, designed to reduce transmission size of XML documents in the wireless environment by performing a binary encoding of the document content. (The WBXML specification is available from the www.wapforum.org Web site.)

There are currently no known techniques for enabling constrained WAP client devices to receive WML or WBXML decks, and provide predictable, expected results from processing these decks, when a deck exceeds the size restrictions of the client device. Accordingly, what is needed is a technique that enables WML or WBXML decks to be transformed for transmission to a client device such that the decks are first reduced to a manageable size, but without any loss of document content.

SUMMARY OF THE INVENTION

An object of the present invention is to provide a technique with which oversized decks may be reduced to a manageable size without loss of content.

Another object of the present invention is to provide a technique whereby this deck reduction is performed on Wireless Markup Language (WML) decks.

It is a further object of the present invention to provide a technique whereby this deck reduction may be performed on decks encoded in other notations such as Wireless Binary Extensible Markup Language (WBXML).

It is another object of the present invention to provide this deck reduction technique whereby the result is then stored persistently, making it available to use upon a subsequent request for the original deck.

It is yet another object of the present invention to provide this deck reduction technique while introducing a minimal number of references to remote cards.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer program product for use in a computing environment capable of having a connection to a network for facilitating network delivery of documents encoded as decks to client devices. This technique comprises: fragmenting a deck into a plurality of sub-decks if the deck has a deck size larger than a target size, wherein each of the sub-decks then has a sub-deck size smaller than the target size and wherein the fragmenting does not discard deck content; and rebinding the sub-decks to one another. In one aspect, the fragmenting further comprises: decoupling a plurality of cards from the deck; and aggregating the decoupled cards into the sub-decks. The technique may further comprise: building a card adjacency graph, the graph comprising a plurality of nodes and links between selected ones of the nodes, wherein each of the nodes represents a card existing in or referenced from the deck and wherein each of the links represents an adjacency relationship between a pair of cards corresponding to a pair of the selected nodes; and applying a card localization process to the card adjacency graph. The applying may further comprise creating a set of distance tuples from the card adjacency graph, wherein the aggregating then uses this set of distance tuples. Preferably, each of the tuples pertains to a selected one of the links and is comprised of a numeric indicator of event binding commonality and a variable substitution factor.

In another aspect, the technique further comprises: receiving a request for the deck from a client device prior to the fragmenting; and forwarding a primary one of the sub-decks to the client device after the rebinding. The target size is preferably based upon this client device.

In a further aspect, the technique further comprises fragmenting zero or more oversized cards from a plurality of cards in the deck, wherein the oversized cards are characterized by having a card size larger than a target card size.

In yet another aspect, the technique further comprises storing the rebound sub-decks on a persistent storage medium.

The decks are preferably encoded using Wireless Markup Language (WML) or Wireless Application Protocol Binary XML notation (WBXML).

The present invention will now be described with reference to the following drawings, in which like reference numbers denote the same element throughout.

BRIEF DESCRIPTION OF THE DRAWINGS

FIG. 4 (comprising FIGS. 4A and 4B) depicts an example WML deck which may be advantageously reduced using the present invention; and FIGS. 5A through 5F3 depict the example deck of FIG. 4 as it changes during the reduction process, as well as a graph and set of tuples used by the preferred embodiment to perform these changes.

DESCRIPTION OF THE PREFERRED EMBODIMENT

Figure 1:
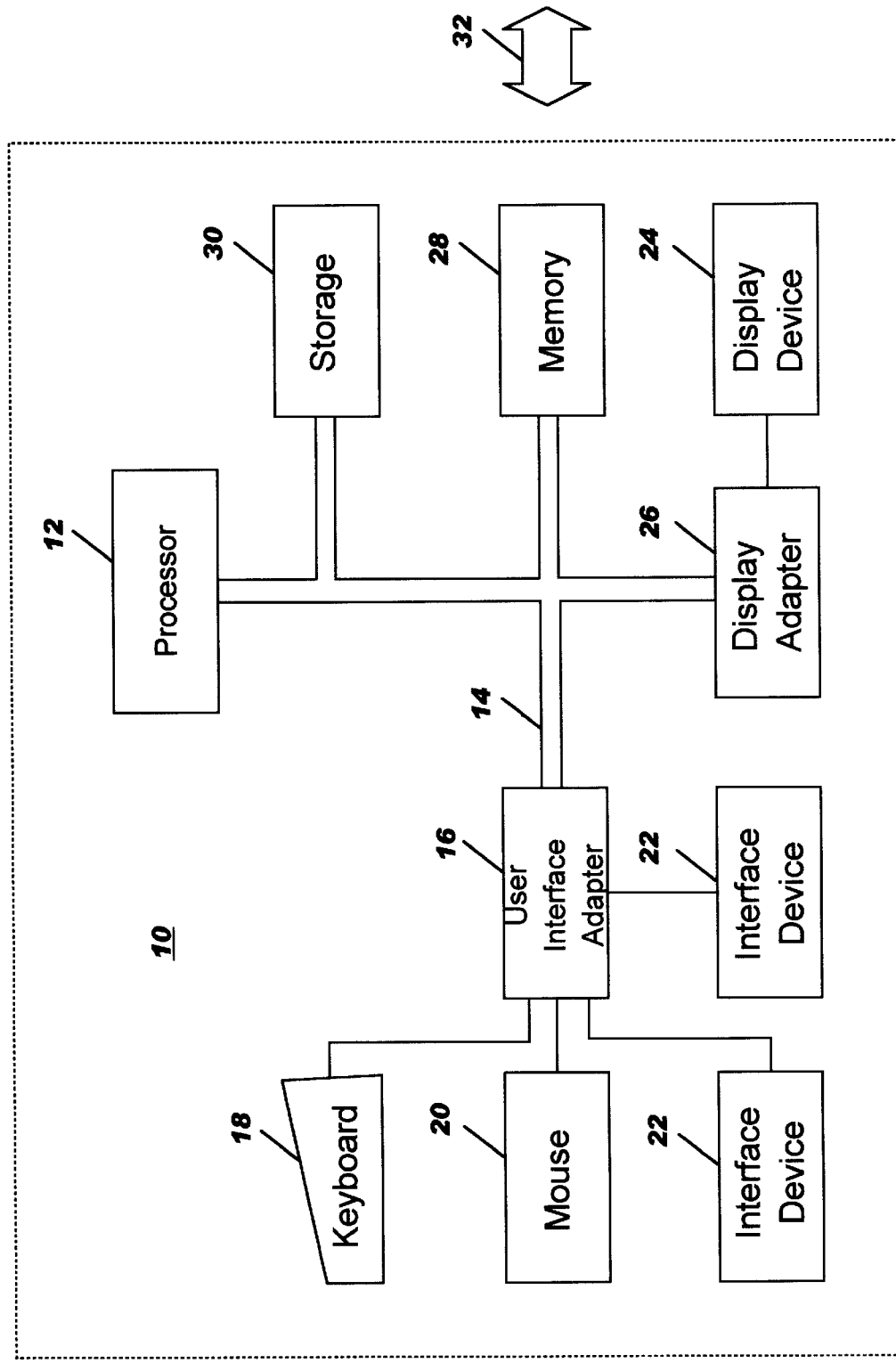
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as the appropriate communications hardware and software, are known in the art.

Figure 2:
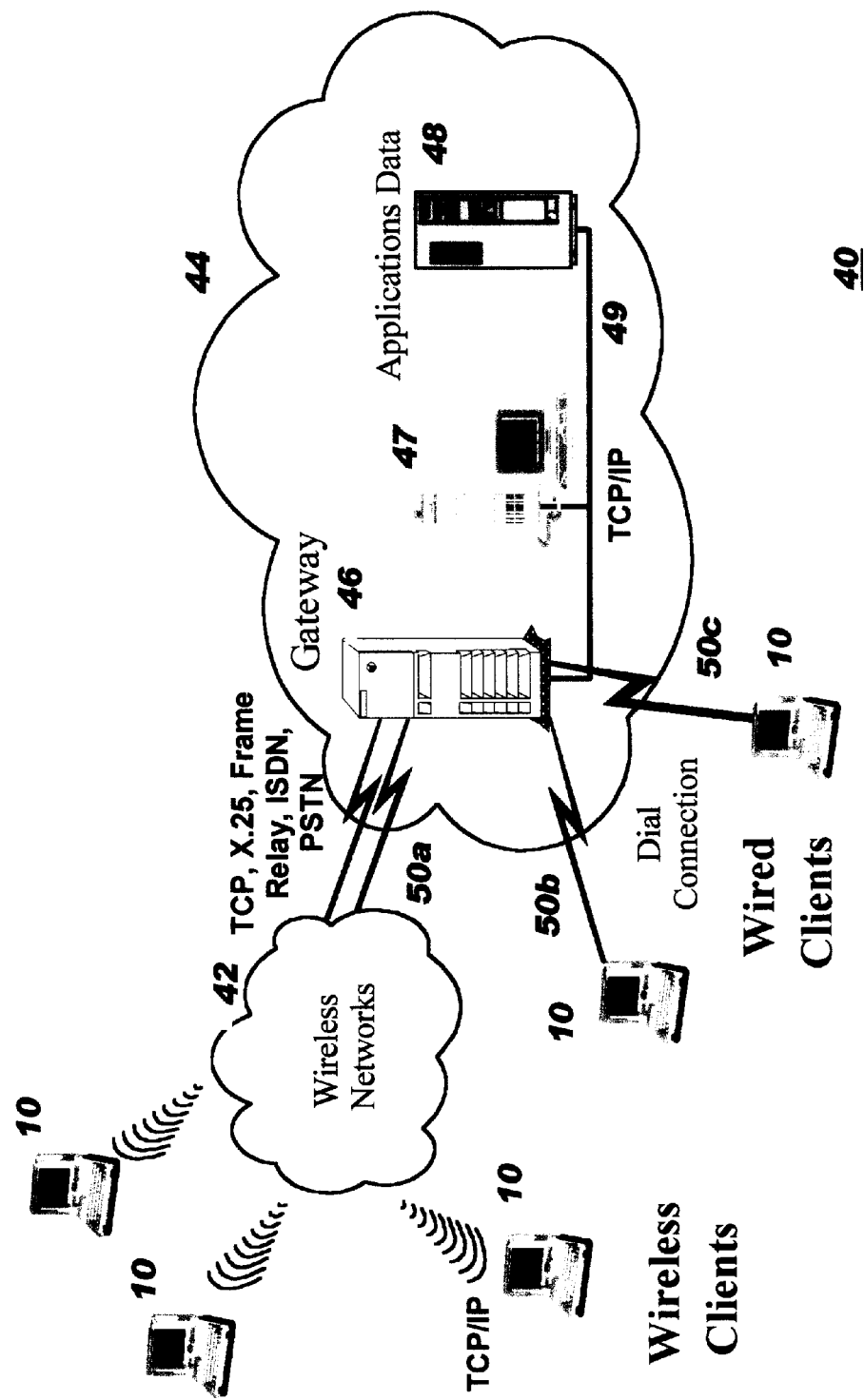
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and (wired) network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, or an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400"are registered trademarks of IBM.) The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using the Transmission Control Protocol/Internet Protocol ("TCP/IP") over a number of alternative connection media, such as cellular phone, radio frequency networks, satellite networks, etc. The wireless network 42 preferably connects to the gateway 46 using a network at connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The present invention may be used in a client-server or multi-tier networking environment, including an Internet environment. Alternatively, the networking environment may be a corporate intranet, an extranet, or any other network environment. In a networking environment, the inventive techniques defined herein are preferably invoked in response to a user's request for a particular WML document. Or, the present invention may be used in a stand-alone environment, where the inventive techniques defined herein are performed in a pre-processing mode (that is, prior to a user requesting a particular document), such that the reduced-size decks are already available for transmission to a client device upon the first request for a document.

When the present invention is used in a networking environment, a client computer on which the present invention operates is typically connected to a server using a wireless connection (although a wireline connection may be used alternatively). Wireless connections use media such as satellite links, radio frequency waves, and infrared waves, whereas wireline connections are those that use physical media such as cables and telephone lines. Many connection techniques can be used with these various media, such as: using the computer's modem to establish a connection over a telephone line; using a LAN card such as Token Ring or Ethernet; using a cellular modem to establish a wireless connection; etc. The processing of documents according to the present invention may take place on the server where a requested document is stored, or at a device such as a WAP gateway or transcoding proxy that resides between the client and server on the network communication path.

When the present invention is used in a stand-alone mode, the processing of documents will preferably occur on the server from which the documents are available to a client, but may alternatively be offloaded from this server to another machine for deck reduction, after which the reduced decks are then made available to the server.

The client computer may be any type of computer processor, including laptop, handheld or mobile computers; vehicle-mounted devices; desktop computers; mainframe computers; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, the client computer will be referred to equivalently as a "workstation", "machine", "device", or "computer", and use of any of these terms or the term "server"refers to any of the types of computing devices described above.

In the preferred embodiment, the present invention is implemented as one or more modules (also referred to as code subroutines, or "objects" in object-oriented programming) of a computer software program (or programs) which provides the inventive deck reduction techniques described herein. The program code of the preferred embodiment may be implemented as objects in an object-oriented programming language, or in a conventional procedurally-oriented language, or in a mix of object-oriented and procedural language code.

The WML deck reduction technique disclosed herein uses a fragmentation scheme, whereby oversized WML decks are split or "cut" into multiple smaller decks, which are then linked together by hyperlinks. (A hyperlink is specified using "anchor" syntax, alternatively abbreviated as the single character "a", and enables navigating among cards, as defined by Section 9.8, "The Anchor Element", of the WML specification.) As previously stated, WML decks are comprised primarily of cards, where these cards define user interaction with the deck and user events within the document. The deck fragmentation defined herein exploits, inter alia, the deck template construct and variable-substitution mechanism defined in WML. The fragmentation technique is also designed to minimize the number of references to external cards (that is, those cards which are not contained within the referencing deck), in order to reduce the number of decks that must be subsequently retrieved.

In the preferred embodiment, an 8-stage approach is used for fragmenting or cutting oversized WML decks. These 8 stages are: (1) reduce oversized cards; (2) decouple cards from deck; (3) build card adjacency graph; (4) card localization; (5) card aggregation; (6) card rebinding; (7) deck persistence; and (8) primary deck forwarding. In a first alternative embodiment, the first stage may be omitted, as will be discussed in more detail below. In another alternative embodiment, also discussed below, Stage 8 may be omitted. These alternative embodiments are within the scope of the present invention.

The preferred embodiment of the present invention will now be discussed with reference to FIG. 3, which depicts a flow chart which sets forth the logic involved with implementing this preferred embodiment. Following this discussion, an example of using the different stages of this technique to reduce the "oversized" example WML deck depicted in FIG. 4 to smaller sub-decks is described with reference to FIGS. 5A through 5F3.

Figure 3:
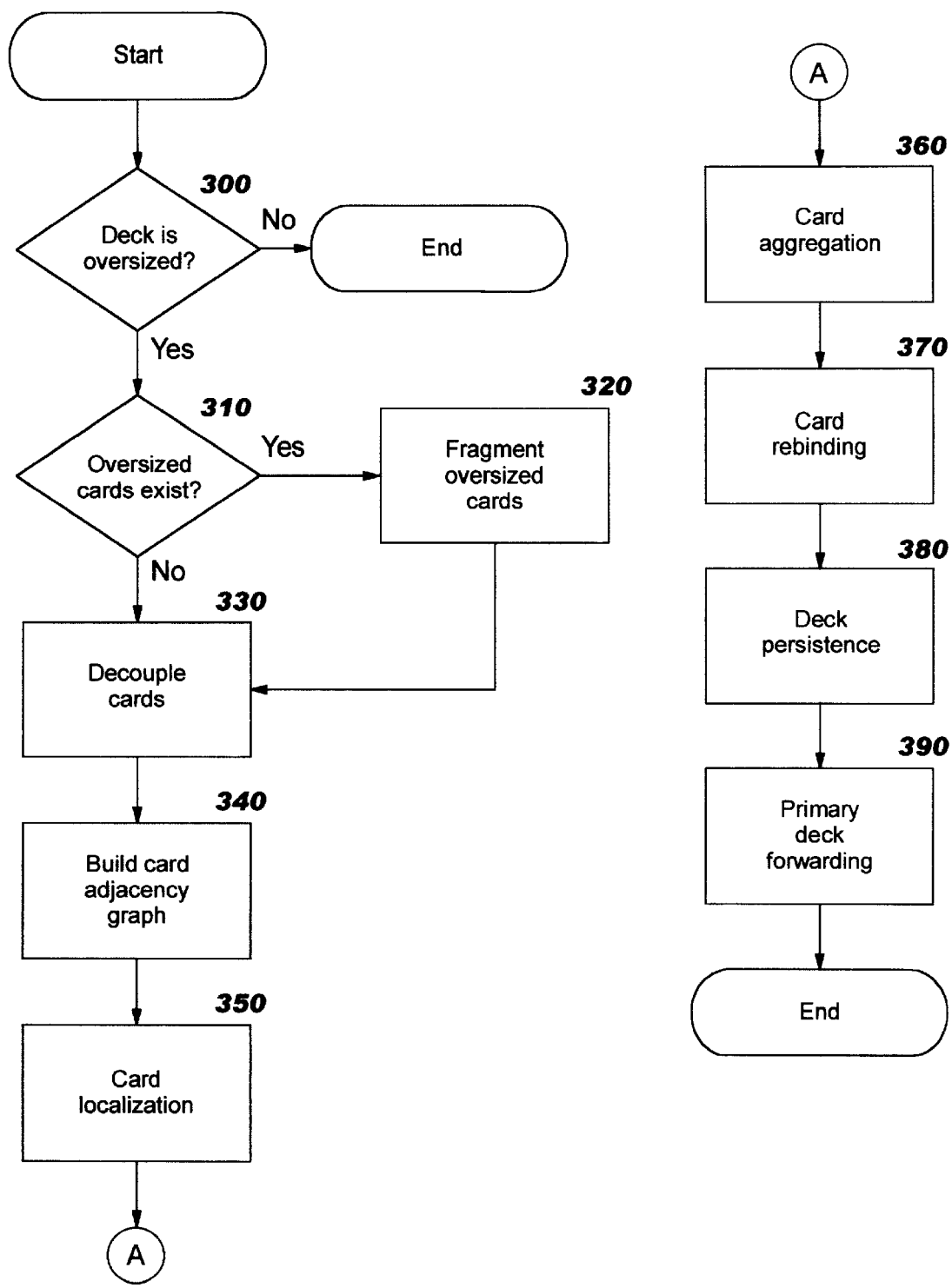
FIG. 3 depicts a flow chart which sets forth the logic involved with a preferred embodiment of the present invention.

The process of FIG. 3 is performed on a single requested deck at a time. When used in a networking environment, the deck to be processed will be that which corresponds to the URL requested by a user at the client device. When used in a standalone environment, the deck may be identified in a number of alternative ways. For example, a window may be displayed to enable a user to type in a deck identifier; a window may be displayed with a selection of deck identifiers, from which a user will make a selection; a list of deck identifiers may be specified in a file, which will be iteratively processed in sequence; etc. A target deck size is required for the processing depicted in FIG. 3. Preferably, this target size is already available upon entry into the logic of FIG. 3; alternatively, logic to determine the target size may be added to FIG. 3, without deviating from the inventive concepts disclosed herein. Techniques for determining the target deck size include retrieving a value for the target device from a stored file of device information, where one or more device types and an associated maximum deck size is stored. When the present invention is implemented on a Web server, the target device may be determined from information in the header of the document request (e.g. from the HyperText Transfer Protocol, or HTTP, request header). Or, a maximum deck size may be entered as a configuration parameter, such that the same upper limit is used for all target devices. This approach has less flexibility than using a device-specific deck size, however, and thus is preferably used only when a device-specific value cannot be determined (such as when preprocessing documents in standalone mode, in the absence of a client request). When the present invention is implemented in a transcoding proxy or a WAP gateway, then detailed information about the target client device is available. For example, the transcoding proxy may be transcoding documents from WML to WBXML for delivery to a phone; in this case, the proxy will know that the target device is a certain type of phone. Techniques for determining the target device type are known in the art, and do not form part of the present invention.

The 8-stage processing of the preferred embodiment begins at Block 300, where a test is made to determine whether the requested deck is oversized. This comparison is made with respect to the target maximum deck size. If the requested deck is not larger than this target size, then the test in Block 300 has a negative result. Reduction is not needed, and the processing of FIG. 3 ends. (Note that this negative result will typically occur on each subsequent request for a particular deck, after the deck reduction process has been performed on a first pass through FIG. 3 for a first request of this deck, because the preferred embodiment will have persistently stored the deck in its reduced form during the Stage 7 processing for the first request.)

If the test in Block 300 has a positive result, then the deck reduction process will be invoked by transferring control to Block 310. Blocks 310 and 320 correspond to Stage 1 processing, whereby any cards that may be oversized will be reduced. This stage may be omitted, as stated earlier: for example, it may be known in a particular environment that oversized cards do not exist. When implemented, each card in the deck will be checked to see if it is oversized (Block 310). This comparison will preferably be made with respect to the same maximum size used for the target deck—that is, determining whether an individual card is itself larger than the target deck size. Alternatively, a separate target size may be used for individual cards, where this separate card maximum size may be determined empirically and provided as a parameter to the implementation. Block 320 indicates that each oversized card will be fragmented into multiple smaller cards, each of which is less than the maximum card size used in the test of Block 310. The technique used in Block 320 comprises partitioning the elements of the input card into two or more groups, such that the size of each group is less than the maximum card size; replicating card-level event bindings into each group; creating <card> and </card> tags to bracket each group; and adding hyperlink elements into each new card (except for the card created from the final group), in order to link the newly-created cards together. Preferably, the partitioning of elements will be performed in a manner that minimizes internal deck fragmentation.

Block 330 is reached following completion of Block 320 for all oversized cards, following a negative result at Block 310, or following a positive result at Block 300 when the Stage 1 processing of Blocks 310 and 320 has not been implemented. Block 330 corresponds to Stage 2 of the deck fragmentation process, where the cards are decoupled from their deck. This decoupling comprises expanding any deck templates that may exist. A deck template is a WML construct for specifying event bindings that apply to all cards within a deck. Individual cards may override or shadow this deck-level event binding, by specifying a card-level event binding using the same name or type, as defined in Section 9.6, "Card/Deck Task Shadowing", of the WML specification. This template expansion process copies each event binding specified in the deck template into each card of the deck, except for those cards which have overridden or shadowed the deck-level template. This enables the cards to be independent of the deck template of the deck in which they were originally encoded.

Block 340 (Stage 3) then creates a card adjacency graph, such that graph theory techniques may be used (as discussed herein) to minimize the number of external card references and maximize shared information (such as event bindings and variable specifications) through the processing of subsequent stages. In this graph, a node corresponds to a card, and an arc is created between each pair of nodes where the corresponding cards are adjacent to one another (i.e. directly reachable from one another). For example, if card "A" includes syntax for (e.g. a hyperlink, event binding, timer, etc.) invoking card "B", the generated graph will include an arc between the nodes "A" and "B".

Each card of the input deck is processed in sequence when creating this graph. If a node does not already exist for the card being processed (i.e. a node created for an earlier reference to A this card, from another card in the same deck), then a new node is created; otherwise, the previously-created node is located in the graph. For each card referenced (i.e. with a hyperlink, etc.) within the card being processed, the existing graph is searched to determine whether a node has already been created for this referenced card. If a node is located, then an arc is created to this node from the node for the card being processed. Otherwise, a new node must be created, and a link (i.e. an arc) is created to this new node from the node for the card being processed. The completed graph that results from Stage 3 then indicates the card adjacencies to one another, from a navigation perspective.

Block 350 performs the card localization process corresponding to Stage 4. This process operates upon the card adjacency graph created in Stage 3. Beginning with the root node of the graph (i.e. the node representing the first card of the input deck), the graph is traversed, preferably using a breadth-first traversal (although a depth-first traversal may be used equivalently). For each node in the graph, the preferred embodiment creates a set of tuples (or other equivalent storage representation), one tuple for each link from this node to another adjacent node. The first element of the tuple is a numerical value greater than or equal to 0, representing the number of common event bindings shared between the two cards. The second element is a variable substitution factor (hereinafter, "VSF"). Each tuple represents a distance between adjacent nodes of the graph, and will used by Stage 5 to determine the most advantageous re-grouping of cards.

In the preferred embodiment, the first element of each tuple is set to "0" if the two cards have no event bindings in common. An event binding is a specification of a particular event, and the processing (i.e. task) to be performed upon occurrence of that event. Refer to the WML as specification for more information on event bindings and their syntax. If, on the other hand, the two cards have at least one event binding in common, then this first element of the tuple is set to "x", where x represents the number of shared event bindings. The purpose of searching for common event bindings is to locate things that can be moved from a card-level specification to the deck level, or template, specification, and thereby reduce the overall size (in terms of characters or bytes) of the deck.

The second element of the tuple, the VSF, is preferably computed using the following algorithm:

$VSF(A,B)$=Max ([(Number of recurring strings shared by Nodes $A$ and $B$)*(Average number of characters in these recurring strings)]−[(Number of variables that will be generated to replace these strings)*(Average number of characters in each variable)], 0)

Note that a VSF=0 implies that variable substitution should not be utilized as a deck reduction factor.

The WML specification defines a variable substitution mechanism, where the special symbol "$" is used in a deck to indicate a reference to a variable. The value of the variable is a text string, which is substituted for the variable reference at run-time in the user agent. The variable value is set using the "setvar" element. (Refer to Section 10.3, "Variables", in the WML specification for more information.) The preferred embodiment of the present invention seeks to reduce deck size by locating repeated text strings, and factoring out the repeated occurrences to achieve an overall reduction in character count using this variable substitution mechanism. As an example of how this technique is used in the present invention, suppose the text string "www.ibm.com/ecommerce/page1" appears in one card, and the text string "www.ibm.com/ecommerce/page2" occurs in another card directly reachable from the first card. A variable can be defined to factor out the common text of these strings; the user agent will then expand the variable at run-time, as required by the WML specification (so that no additional processing requirements are being placed on the user agent by taking advantage of this mechanism), restoring the text strings to their original format. A variable name must be created for use with this technique. Preferably, a simple name-creation technique is used, such as using the single letters of the alphabet in sequence for each subsequent variable to be created. (Since WML variables are case sensitive, 52 different variables can be created using the upper case and the lower case letters. If more than 52 variable names are needed, 2-character names can then be generated, followed by using 3 characters, etc.) Using the example string just discussed, the common text string is "www.ibm.com/ecommerce/page", and the card-specific parts of the string are "1" (for the first card) and "2" (in the second card). Suppose the common text is assigned to the variable "B". Then a setvar element must be generated, as follows: <setvar name="B"value="$(www.ibm.com/ecommerce/page)"/>, in order to enable the text string reconstruction at the user agent. The text string in the first card is then replaced by the syntax "$B;1" and the string in the second card is replaced by "$B;2"(where the quote marks are included herein for emphasis, and do not form part of the replacement syntax). Any active variable names (that is, those defined in the original deck or set by prior decks) must be avoided when generating new variable names. In the preferred embodiment, this is achieved by scanning each original deck for variable initialization in <setvar> elements and variable references ($ followed by any of the variable syntax as described in the WML specification). All potentially active variable names thus identified are maintained in a list which persists throughout the processing of all of the decks, and this list is searched for conflicting names before a new name is assigned.

Values are assigned to WML variables as a side-effect of navigation between cards. The simplest way to ensure that the necessary variables are set correctly is to insert a blank card as the first card of the primary deck, which contains two <onevent> elements: one for an "onenterforward" event which sets the required variables and redirects the user to the initial content card, and an "onenterbackward" event defined as <prev> to ensure that backwards navigation works as expected.

Thus, it can be seen that the VSF corresponds to the amount of savings that can be accomplished when sharing variables (i.e. text strings) between two particular cards.

Once all tuples have been created, control reaches Block 360, which represents the Stage 5 processing of card aggregation. Card aggregation is the process of grouping together cards, creating new "sub-decks" that together represent the same information content as the original deck being processed. The cards will be grouped into new decks each having a size less than the target maximum deck size, discussed earlier.

The grouping process of Block 360 uses the tuples created in Stage 4, and the node adjacencies from the adjacency graph created in Stage 3. Each node in the graph is processed, preferably using a breadth-first traversal, to determine which of the cards directly reachable from the card corresponding to that node is more advantageously grouped with the card being processed. Suppose, for example, that a node "A" has links to nodes "B" and "C", indicating that the two cards represented by nodes "B" and "C" are directly reachable from the card represented by node "A". Further suppose that either card "B" or card "C" will fit with card "A" in a new deck, but including both together along with card "A" would exceed the maximum deck size. Thus, a choice between including "B" or "C" must be made. The purpose of Stage 5 is to choose one of these cards in the most advantageous manner. In the preferred embodiment, this determination is made according to the following expression, where "A" refers to the node (i.e. card) being processed, and "B" and "C" refer to two of A's adjacent nodes:

$$\text{group } A \text{ with } B \text{ iff } [dist(A,B) < dist(A,C) \text{ AND } dist(A,B) < dist(B,C)]$$

where dist(x,y) in this expression represents the distance between nodes x and y as represented by the value of the tuple previously created for the link from node x to node y. According to the preferred embodiment, more weight is given to the sharing of event bindings, as compared to the sharing of text strings represented by VSF. Thus, the distance from A to B when the A-to-B tuple has a value "x" for its first element is by definition shorter than the distance from A to C when the A-to-C tuple has a value "y" for its first element, where x>y, regardless of the value of each second element. The VSF values are therefore only needed in comparing the distance when the first elements are identical. As will be obvious from review of this expression, it applies a precedence for grouping cards which share information. That is, if card A shares more information with card B than it shares with card C, and also more than card B shares with card C, then card B is to be grouped with card A. (The comparison to the distance between cards B and C is a forward-looking approach, which accounts for the fact that it may be even more advantageous to include neither card B nor card C with card A, but instead to put cards B and C together in a sub-deck. In this manner, internal fragmentation of decks is minimized. For a particular node pair B, C which are not directly linked and thus have no tuple, this expression may be evaluated by considering the distance (B,C) as infinity.)

This grouping expression will be performed repeatedly for a node of the graph, comparing the tuples for each of its directly-reachable nodes until selecting a card to be included with the card being processed. Once a card has been selected, any common event bindings (i.e. when the first element of the tuple is >0) can be factored out by replacing them with bindings in the deck template. This is, in effect, the converse of the template expansion process described above with reference to Block 330. Any text strings shared by the cards being combined may then be factored out, and replaced by a variable definition and variable references, as discussed above with reference to the VSF calculations of Block 350. (Note that a number of characters are required to specify the variable substitution syntax, comprising the <setvar> element, etc. Preferably, this substitution technique will only be performed when a net savings in character counts will be realized.) Each node selected for inclusion in a sub-deck is preferably marked in some manner, such as setting a binary flag that is associated with each node, to indicate that it has already been assigned to a sub-deck. Once these processes have been completed, the tuples for any remaining links from the node being processed may be examined to determine whether sufficient space exists to include another card in this deck. When no more cards will fit into the current deck, a new deck is begun. The card aggregation process is performed for this new deck. This process is repeated until all the cards represented by the adjacency graph have been grouped into decks.

Note that it may happen that after processing the cards and tuples from the graph, a number of cards may exist (as leaf nodes) which are not directly reachable from one another. These cards may be grouped into sub-decks if desired (provided they meet the target size restrictions) to reduce the number of sub-decks created, or they may be placed into individual separate decks, to potentially reduce the amount of unrequested content that is transmitted.

Block 370 is performed next, where the card rebinding of Stage 6 occurs. This comprises reformatting hyperlinks in the sub-decks which have been created, in order to link together those cards which were adjacent in the graph but which were grouped into different decks by Stage 5. In the preferred embodiment, the tuples and the adjacency graph are used again in this stage, to determine those adjacent nodes which were not grouped into the same sub-deck: the cards represented by these nodes are those for which hyperlinks must be reformatted. Preferably, a unique URL is generated for each sub-deck, by appending a sequence number or other suffix to the URL of the original deck. This unique URL is then used to refer to the cards grouped within that sub-deck, by specifying the unique URL on the reformatted hyperlinks. (Note that while FIG. 3 shows Stage 6 sequentially following Stage 5, it will be obvious to one of skill in the art that the processing of these two stages may alternatively be intermingled. For example, when the operation of Stage 5 determines that a deck is full and adjacent nodes must be grouped into different sub-decks, the tuples of these now-remote cards can be recorded; Stage 6 can then process those recorded tuples instead of re-traversing the graph.) Any card names existing in the original deck must be avoided when generating new card names. In the preferred embodiment, this is achieved by scanning the original deck, and recording the names found as values of the "id" attribute of each card during this scan, e.g. in a table of already-used card names.

Block 380 corresponds to Stage 7, deck persistence. This stage comprises storing the newly-created sub-decks to persistent storage, using the sub-deck URLs which have been generated. (In the preferred embodiment, the sub-deck containing the primary card of the original deck continues to be identified by the original URL.) This stage may be omitted without deviating from the inventive concepts disclosed herein; however, because the processing overhead of this deck reduction technique is avoided for subsequent requests for a deck that has been cut and stored, this stage will preferably be included in an embodiment of the present invention.

The final stage of processing, Stage 8, is the forwarding of the primary deck to the requesting client, as indicated by Block 390. The primary deck is the sub-deck which maintains the primary card as its initial card. (As defined in the WML specification, the primary card of a deck is its first card, except in cases where a fragment identifier is used and this fragment identifier specifies a card other than the first card; in the latter case, the primary card is the card specified by the fragment identifier.) Upon receiving this primary deck, the user agent on the client machine displays the first card in the same manner in which it would have been displayed without use of the present invention, as the techniques defined herein do not remove any information content that existed in the original deck in the process of fragmenting the deck into manageable-sized sub-decks. After forwarding the primary deck to the client machine, the processing of FIG. 3 for the original deck is complete. As sub-decks are needed at the client machine, they will be requested automatically using the standard techniques of the user agent.

As stated previously, the processing of Stage 8 is omitted in an alternative embodiment where the present invention is used in standalone mode, as there is no requesting client machine to which the primary deck can be forwarded.

Referring now to the example WML deck 400 in FIG. 4, the results of applying this novel technique will be illustrated. Suppose this example deck 400 is oversized, as compared to some target deck size. Further suppose that two of the four cards of the deck are oversized cards, as compared to a particular target card size. The cards are labeled with reference numerals 420, 430, 440, and 450 in FIG. 4, with the oversized cards being 440 and 450. FIG. 5 (comprising FIGS. 5A–5F3) illustrates the changes that occur during the stages of the reduction process, as well as the graph and set of tuples used by the preferred embodiment to perform these changes. The final result of the reduction process is the set of three sub-decks shown in FIGS. 5F1 through 5F3.

FIG. 5A (comprising FIGS. 5A1–5A3) illustrates the result of the card fragmentation process, which is applied to oversized cards 440 and 450 at Stage 1 (Block 320 of FIG. 3). Each of these oversized cards is fragmented into two new cards, indicated in FIG. 5A as elements 502 and 503 (resulting from fragmenting card 440) and 504 and 505 (from 450). Here it can be seen that the original card-to-card linkage 441 from card 440 to card 450 (where card 450 has identifier "p4" as shown at 451, and referenced at 442) has been inserted in the second of the new card fragments 503 (at 508), while a new link 506 has been created in the first fragment 502 to provide linkage to the second fragment 503. Similarly, the linkage 452 to an external reference from original card 450 has been moved to the second fragment 505 created from this card (at 511), while a new linkage 510 in the first fragment 504 links these fragments together. The card identifiers generated for the new cards are shown in FIG. 5A as "frag1" 507 and "frag2" 509. Deck 500 now has six cards, each of a size below the maximum card size.

Note that the cards being manipulated in this example are shown in FIG. 5A (and FIG. 5B) as existing within deck tags "<wml>"(see element 512) and "</wml>"(element 513). This is for purposes of illustration only, and is not meant to imply a particular format for storing the interim results of the deck reduction process.

FIG. 5B (comprising FIGS. 5B1–5B3) illustrates the deck 500 after the deck-level template 501 (see FIG. 5A) has been expanded by the Stage 2 card decoupling process (Block 300 of FIG. 3). Note that the deck 500' of FIG. 5B has no deck template. The template 501 (also shown as element 410 in FIG. 4) now appears as a card-level event binding in five of the six cards of deck 500', at 527, 528, 529, 530, 531. The event binding 526, which appeared in the original deck at 421, overshadowed the deck-level template 501 for the first card; thus, as discussed above with reference to Stage 2, the template is not copied into this card.

FIG. 5C depicts the adjacency graph created during Stage 3 (Block 340 of FIG. 3), containing nodes for the identifiers of the six cards from the deck 500' of FIG. 5B. Each node has a single arc, representing the fact that each card of the deck has only one link to another card of this deck. Note that references to external cards or decks, such as the hyperlink to "home.wml" at 526, are not relevant for purposes of the deck reduction technique and thus are not used when creating the adjacency graph.

The tuples created during the card localization of Stage 4 processing (Block 350 of FIG. 3) are depicted in FIG. 5D1. The five tuples shown in this figure correspond to the five internode links of the adjacency graph of FIG. 5C. Only the first element of the tuples has been computed for this example: the VSF has been set to 0, but it will be obvious that repeated text strings may be found in the content of the example deck if variable substitution is to be used as a deck reduction factor. As indicated by these five tuples, each pair of nodes except (p1, p2) shares one event binding in common. (By inspection of the corresponding cards, it can be seen that in this example, the shared event binding is that created from the deck template as elements 527–531 when decoupling the cards.) FIG. 5D2 illustrates an alternative approach to tuple creation which may be used without deviating from the inventive concepts of the preferred embodiment. Here, tuples have been created for each pair of nodes without regard to their relative location in the adjacency graph. This information may be useful for grouping cards in the optional aspect discussed above for Stage 5 processing, where non-adjacent cards may be selected for grouping into sub-decks.

The output resulting from Stage 5 card aggregation (Block 360 of FIG. 3) is represented by FIGS. 5E1 through 5E3. Three sub-decks 540, 550, 560 have been created. The first two cards 520, 521 of deck 500' (in FIG. 5B) are now aggregated into the first sub-deck 540 (see 541, 542) in FIG. 5E1; the next two cards 522, 523 form the second sub-deck 550 (FIG. 5E2); and the final two cards 524, 525 form the third sub-deck 560 (FIG. 5E3). Note that the two cards 541, 542 are identical to cards 520, 521 from which they were created. This is because there were no card-level event bindings shared by these cards that could be factored to the deck-level template, and because the variable substitution process is not being used for deck reduction in these examples. Cards 522 and 523, however, are not identical to cards 552 and 553 of the sub-deck 550 into which they were aggregated. This is because the common event binding 528, 529 has been factored out of each card and replaced with a binding in the deck template 551. Similar factoring has been applied to bindings 530, 531 of cards 524 and 525 when creating the final sub-deck 560, generating the deck template 561.

The three sub-decks 540', 550', 560' of FIGS. 5F1 through 5F3, respectively, are created by applying Stage 6, card rebinding (Block 370 of FIG. 3). Deck 540' differs from deck 540 of FIG. 5E1 in that the now-external hyperlink at 545 has been reformatted to include the URL of deck 550 (also 550'), shown here as "360b.wml", in which the card having identifier "p3" (see 546 of FIG. 5F1 and 554 of FIG. 5F2) is located. Similarly, deck 550' has a reformatted hyperlink 555, shown as "360c.wml", identifying the deck in which the card having identifier "p4" (see 556 of FIG. 5F2 and 564 of FIG. 5F3) resides.

The reduced-size decks of FIGS. 5F1–5F3 may now be persistently stored, according to Stage 7 processing. When a user requests the URL of the original deck 400, the primary deck 540' will now be transmitted (Stage 8). Subsequent deck 550' will only be transmitted if the user navigates to one of the cards in this deck (which in this example must be the first card, "p3"). Similarly, deck 560' will only be transmitted if the user navigates from card "frag1" of deck 550' to card "p4" of deck 560'. Thus, the unit of transmission is reduced in size, and the overall amount of data transmitted may be reduced, depending on the user's navigation choices.

As has been demonstrated, the inventive concepts disclosed herein accomplish the advantageous reduction of oversized WML decks to decks of a manageable size without loss of deck content, through template reuse for common event bindings and variable substitution for common text string occurrences, while introducing a minimal number of references to external cards (i.e. cards defined in a now-separate sub-deck).

While the preferred embodiment of the present invention has been described, additional variations and modifications in that embodiment may occur to those skilled in the art once they learn of the basic inventive concepts. In particular, the preferred embodiment has been described in terms of its use with decks encoded in the WML notation. However, the inventive techniques described herein may also be applied to decks encoded using WBXML, or any other notation having similar semantics and similar capabilities. Therefore, it is intended that the appended claims shall be construed to include both the preferred embodiment and all such variations and modifications as fall within the spirit and scope of the invention.

We claim:

1. In a computing environment capable of having a connection to a network, a computer program product for facilitating network delivery of documents encoded as decks to client devices, said computer program product residing on a storage medium readable by a computer system in said environment and comprising:

computer-readable program code means for fragmenting a deck into a plurality of sub-decks if said deck has a deck size larger than a target size, wherein each of said sub-decks then has a sub-deck size smaller than said target size and wherein said fragmenting does not discard deck content, further comprising:

computer-readable program code means for decoupling a plurality of cards from said deck;

computer-readable program code means for building a card adjacency graph, said graph comprising a plurality of nodes and links between selected ones of said nodes, wherein each of said nodes represents a card existing in or referenced from said deck and wherein each of said links represents an adjacency relationship between a pair of cards corresponding to a pair of said selected nodes;

computer-readable program code means for applying a card localization process to said card adjacency graph, further comprising computer-readable program code means for creating a set of distance tuples from said card adjacency graph; and computer-readable program code means for aggregating said decoupled cards into said sub-decks using said set of distance tuples; and computer-readable program code means for rebinding said sub-decks to one another.

2. The computer program product for facilitating network delivery of documents encoded as decks according to claim 1, wherein each of said tuples pertains to a selected one of said links and is comprised of a numeric indicator of event binding commonality and a variable substitution factor.

3. The computer program product for facilitating network delivery of documents encoded as decks according to claim 1, further comprising:

computer-readable program code means for receiving a request for said deck from a client device prior to said fragmenting; and computer-readable program code means for forwarding a primary one of said sub-decks to said client device after said rebinding.

4. The computer program product for facilitating network delivery of documents encoded as decks according to claim 1, further comprising computer-readable program code means for fragmenting zero or more oversized cards from a plurality of cards in said deck, wherein said oversized cards are characterized by having a card size larger than a target card size.

5. The computer program product for facilitating network delivery of documents encoded as decks according to claim 1, further comprising computer-readable program code means for storing said rebound sub-decks on a persistent storage medium.

6. The computer program product for facilitating network delivery of documents encoded as decks according to claim 3, wherein said target size is based upon said client device.

7. The computer program product for facilitating network delivery of documents encoded as decks according to claim 1, wherein said decks are encoded using Wireless Markup Language (WML).

8. The computer program product for facilitating network delivery of documents encoded as decks according to claim 1, wherein said decks are encoded using Wireless Application Protocol Binary XML notation (WBXML).

9. A system for facilitating network delivery of documents encoded as decks to client devices in a computing environment capable of having a connection to a network, comprising:

means for fragmenting a deck into a plurality of sub-decks if said deck has a deck size larger than a target size, wherein each of said sub-decks then has a sub-deck size smaller than said target size and wherein said fragmenting does not discard deck content, further comprising:

means for decoupling a plurality of cards from said deck;

means for building a card adjacency graph, said graph comprising a plurality of nodes and links between selected ones of said nodes, wherein each of said nodes represents a card existing in or referenced from said deck and wherein each of said links represents an adjacency relationship between a pair of cards corresponding to a pair of said selected nodes;

means for applying a card localization process to said card adjacency graph, further comprising computer-readable program code means for creating a set of distance tuples from said card adjacency graph; and means for aggregating said decoupled cards into said sub-decks using said set of distance tuples; and means for rebinding said sub-decks to one another.

10. The system for facilitating network delivery of documents encoded as decks according to claim 9, wherein each of said tuples pertains to a selected one of said links and is comprised of a numeric indicator of event binding commonality and a variable substitution factor.

11. The system for facilitating network delivery of documents encoded as decks according to claim 9, further comprising:

means for receiving a request for said deck from a client device prior to said fragmenting; and means for forwarding a primary one of said sub-decks to said client device after said rebinding.

12. The system for facilitating network delivery of documents encoded as decks according to claim 9, further comprising means for fragmenting zero or more oversized cards from a plurality of cards in said deck, wherein said oversized cards are characterized by having a card size larger than a target card size.

13. The system for facilitating network delivery of documents encoded as decks according to claim 9, further comprising means for storing said rebound sub-decks on a persistent storage medium.

14. The system for facilitating network delivery of documents encoded as decks according to claim 11, wherein said target size is based upon said client device.

15. The system for facilitating network delivery of documents encoded as decks according to claim 9, wherein said decks are encoded using Wireless Markup Language (WML).

16. The system for facilitating network delivery of documents encoded as decks according to claim 9, wherein said decks are encoded using Wireless Application Protocol Binary XML notation (WBXML).

17. A method for facilitating network delivery of documents encoded as decks to client devices in a computing environment capable of having a connection to a network, comprising the steps of:
  fragmenting a deck into a plurality of sub-decks if said deck has a deck size larger than a target size, wherein each of said sub-decks then has a sub-deck size smaller than said target size and wherein said fragmenting does not discard deck content, further comprising the steps of:
    decoupling a plurality of cards from said deck;
    building a card adjacency graph, said graph comprising a plurality of nodes and links between selected ones of said nodes, wherein each of said nodes represents a card existing in or referenced from said deck and wherein each of said links represents an adjacency relationship between a pair of cards corresponding to a pair of said selected nodes;
    applying a card localization process to said card adjacency graph, further comprising computer-readable program code means for creating a set of distance tuples from said card adjacency graph; and
    aggregating said decoupled cards into said sub-decks using said set of distance tuples; and
  rebinding said sub-decks to one another.

18. The method for facilitating network delivery of documents encoded as decks according to claim 17, wherein each of said tuples pertains to a selected one of said links and is comprised of a numeric indicator of event binding commonality and a variable substitution factor.

19. The method for facilitating network delivery of documents encoded as decks according to claim 17, further comprising the steps of:
  receiving a request for said deck from a client device prior to said fragmenting step; and
  forwarding a primary one of said sub-decks to said client device after said rebinding step.

20. The method for facilitating network delivery of documents encoded as decks according to claim 17, further comprising the step of fragmenting zero or more oversized cards from a plurality of cards in said deck, wherein said oversized cards are characterized by having a card size larger than a target card size.

21. The method for facilitating network delivery of documents encoded as decks according to claim 17, further comprising the step of storing said rebound sub-decks on a persistent storage medium.

22. The method for facilitating network delivery of documents encoded as decks according to claim 19, wherein said target size is based upon said client device.

23. The method for facilitating network delivery of documents encoded as decks according to claim 17, wherein said decks are encoded using Wireless Markup Language (WML).

24. The method for facilitating network delivery of documents encoded as decks according to claim 17, wherein said decks are encoded using Wireless Application Protocol Binary XML notation (WBXML).

25. A method of facilitating network delivery of documents encoded as decks to client devices in a computing environment capable of having a connection to a network, said decks comprising a plurality of cards, said method comprising steps of:
  duplicating, from an input deck which exceeds a target deck size, deck-level information into each card of said input deck, unless said card overrides said deck-level information;
  determining one or more sets of shared information, said shared information occurring in two or more of said cards;
  aggregating said cards to create new sub-decks, such that a size of each of said sub-decks is less than said target deck size, by selecting one or more of said cards in which one or more of said sets of shared information occurs and factoring out duplicated occurrences among said selected one or more cards, thereby creating one of said new sub-decks; and
  inserting links into said new sub-decks such that said new sub-decks can be traversed in an analogous manner as said input deck.

26. The method according to claim 25, wherein said sets of shared information comprise shared text and shared event bindings.

27. The method according to claim 25, further comprising the steps of:
  determining, prior to operation of said duplicating step, which of said cards exceed a target card size; and
  for each determined card,
    fragmenting said determined card into a plurality of sub-cards, each of said sub-cards having a card size less than said target card size; and
    inserting a card-to-card link into each of said sub-cards except a final one of said sub-cards, thereby allowing said sub-cards to be traversed in an analogous manner as said determined card.

* * * * *